(12) United States Patent
Smith

(10) Patent No.: US 8,967,311 B2
(45) Date of Patent: Mar. 3, 2015

(54) DIRECTED GAS SYSTEMS FOR IMPROVING AERODYNAMICS OF A VEHICLE IN CROSS WIND CONDITIONS

(75) Inventor: Jeffrey P. Smith, Prosper, TX (US)

(73) Assignee: PACCAR Inc., Bellevue, WA (US)

( * ) Notice: Subject to any disclaimer, the term of this patent is extended or adjusted under 35 U.S.C. 154(b) by 307 days.

(21) Appl. No.: 13/309,366

(22) Filed: Dec. 1, 2011

(65) Prior Publication Data

US 2013/0140849 A1    Jun. 6, 2013

(51) Int. Cl.
*B60K 11/06* (2006.01)

(52) U.S. Cl.
USPC .......................................... 180/68.2; 180/309

(58) Field of Classification Search
USPC ............ 180/309, 68.1, 68.2, 68.4; 296/180.1; 244/207
See application file for complete search history.

(56) References Cited

U.S. PATENT DOCUMENTS

| | | | |
|---|---|---|---|
| 3,911,851 A * | 10/1975 | Canazzi ........................... | 440/40 |
| 3,972,494 A | 8/1976 | Drews | |
| 4,180,290 A | 12/1979 | Drews | |
| 4,353,587 A | 10/1982 | Brenholt | |
| 4,460,055 A | 7/1984 | Steiner | |
| 4,673,206 A | 6/1987 | Kretschmer | |
| 4,858,565 A * | 8/1989 | King ............................ | 123/41.31 |
| 5,374,013 A | 12/1994 | Bassett | |
| 5,813,625 A * | 9/1998 | Hassan et al. ............... | 244/17.11 |
| 5,894,987 A * | 4/1999 | Layne et al. .................... | 165/44 |
| 5,908,217 A | 6/1999 | Englar | |
| 6,068,328 A | 5/2000 | Gazdzinski | |
| 6,185,489 B1 * | 2/2001 | Strickler ....................... | 701/31.9 |
| 6,390,217 B1 * | 5/2002 | O'Brien et al. .............. | 180/68.6 |
| 6,467,538 B1 * | 10/2002 | Acre et al. ..................... | 165/266 |
| 6,527,333 B2 * | 3/2003 | Hewitt et al. .............. | 296/180.1 |
| 6,772,976 B1 * | 8/2004 | Rouse et al. ................... | 244/1 R |
| 6,793,177 B2 | 9/2004 | Bonutti | |
| 7,121,368 B2 | 10/2006 | MacKelvie | |
| 7,237,827 B2 | 7/2007 | Shahbazi | |
| 7,451,844 B2 * | 11/2008 | Kunikata ..................... | 180/68.1 |
| 7,510,149 B2 | 3/2009 | Miller | |
| 7,559,391 B2 * | 7/2009 | Bradley et al. .............. | 180/68.1 |
| 7,886,859 B2 * | 2/2011 | Caldirola ..................... | 180/68.2 |
| 8,128,037 B2 * | 3/2012 | Powell et al. ................. | 244/208 |
| 8,162,086 B2 * | 4/2012 | Robinson ..................... | 180/68.1 |

(Continued)

FOREIGN PATENT DOCUMENTS

EP    0 420 826 B1    6/1994

OTHER PUBLICATIONS

International Search Report and Written Opinion mailed Mar. 15, 2013, issued in corresponding International Application No. PCT/US2012/067386, filed Nov. 30, 2012, 9 pages.

(Continued)

*Primary Examiner* — J. Allen Shriver, II
*Assistant Examiner* — Emma K Frick
(74) *Attorney, Agent, or Firm* — Christensen O'Connor Johnson Kindness PLLC

(57) ABSTRACT

Systems and methods are disclosed that utilize exhausted gases from an internal combustion engine (e.g., piston engine, rotary engine, turbine engine, etc.) of a vehicle for reducing the aerodynamic drag thereon. In some disclosed examples, the systems and methods utilize a generated gas flow from, for example, electric fans, engine driven or pneumatically/hydraulically driven pumps, etc., for reducing aerodynamic drag. The generated gas flows in several disclosed examples are directed in a generally opposing direction of (i.e., against) prevailing cross winds.

20 Claims, 8 Drawing Sheets

(56) References Cited

U.S. PATENT DOCUMENTS

| | | | |
|---|---|---|---|
| 8,196,993 B2* | 6/2012 | Smith | 296/180.3 |
| 8,282,037 B2* | 10/2012 | Jain | 244/53 B |
| 8,479,853 B2* | 7/2013 | Verbrugge | 180/68.2 |
| 8,496,285 B2* | 7/2013 | Rogers et al. | 296/180.1 |
| 8,544,583 B2* | 10/2013 | Ajisaka | 180/68.1 |
| 2006/0103167 A1 | 5/2006 | Wong | |
| 2008/0150321 A1 | 6/2008 | Neale | |
| 2009/0140543 A1 | 6/2009 | Caldirola | |
| 2010/0007172 A1 | 1/2010 | Zhu | |
| 2012/0323448 A1* | 12/2012 | Charnesky et al. | 701/49 |
| 2013/0140103 A1* | 6/2013 | Smith | 180/309 |
| 2013/0158828 A1* | 6/2013 | McAlister | 701/70 |

OTHER PUBLICATIONS

"Coanda Soliton Effect," montalk.net, Jul. 20, 2004, <http://montal.net/science/71/coanda-soliton-effect> [retrieved Oct. 18, 2010], 5 pages.

"Exhaust," Formula 1 Dictionary, <http://f1-dictionary.110mb.com/exhoust.html> [retrieved Oct. 18, 2010], 6 pages.

"Super Cavitation Technology Applied to Cars?" Yahoo!7 Answers, <http://au.answers.yahoo.com/question/index?qid=20100403055156AA6yNpg> [retrieved Oct. 18, 2010), 3 pages.

"Super Cavitation Weapons: Surface, Undersea, and Low to Intermediate Atmospheric Theaters," The Black Hole-//-Universal Community > Technology & Science > Mad Science, <http://blackhole.xcerces.com/showthread.php?t=7118> [retrieved Oct. 18, 2010, 6 pages.

* cited by examiner

DIRECTED GAS SYSTEMS FOR IMPROVING AERODYNAMICS OF A VEHICLE IN CROSS WIND CONDITIONS

BACKGROUND

Numerous means have been sought to improve the fuel-efficiency of moving bodies, and especially moving bluff bodies, by reducing their aerodynamic drag. In the field of surface transportation, and particularly in the long-haul freight industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the semi-trailer. The front profile of a conventional tractor is typically a bluff body, producing significant pressure drag at typical highway speeds. One reason for the large pressure drag is the presence of a sharp angle located at a leading edge of the tractor hood. More specifically, typical tractor front sections include a substantially vertical front surface or grill that meets, along an upper edge, a substantially horizontal top surface. The air flow passing over the front section, therefore, must negotiate an abrupt change in direction as the edge where the hood structure transitions from a substantially vertical orientation to a substantially horizontal orientation. This abrupt turn causes the flow to 'separate' from the top surface of the hood, forming a highly turbulent region of air located directly above the top surface of the hood, between the leading edge and the windshield.

Referring to FIG. 1, a perspective view of a prior art Class 8 tractor 10 showing an air stream 12 flowing over a hood 16 is depicted. The depicted air stream 12 encounters the conventionally shaped Class 8 tractor 10 at the substantially vertical surface of the front surface or grill 14 of the hood 16. (It will be appreciated that for purposes of the present aerodynamic discussion, the tractors 10 forward motion at highway speeds is equivalent to an air stream 12 having a similar but opposite velocity flowing over a stationary tractor.) The air stream 12 turns upwardly as it negotiates the grill 14, and separates at a leading edge 15 of the hood 16, thereby forming a vortex or wake region 22 located aft of the leading edge 15. The airflow separation at the leading edge 15 causes the formation of a large wake region 22 and pressure losses due to eddy formation in the wake region, thereby increasing drag on the vehicle.

Previous investigations for reducing aerodynamic drag of tractor-trailer combinations, including reducing the bluff body characteristics of the conventional Class 8 tractor 10, resulted in streamlining the outer contours of the front section of the tractor 10, widespread adoption of fixed air deflectors mounted on the roofs of tractor cabs, and wholly redesigned tractors that utilize aerodynamic fairings to gradually increase the relatively small frontal area of the tractors to match, and to blend smoothly with, the larger cross-section of typical trailers. For example, in order to reduce abrupt changes in air flow over the hood, some modem tractor hoods have been made to slope downwardly from the windshield toward the front of the tractor, creating a less abrupt transition between the front grill 14 of the front section and the top surface of the hood 16. This more aerodynamic shape reduces the amount of flow separation, and consequently reduces the pressure drag exhibited upon the vehicle. However, such a design may still incorporate discontinuous regions, due to packaging for under hood components such as radiators, air ducting, or coolant tanks, that produce abrupt changes in air flow resulting in the creation of a wake region 22, again an increase in drag.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle is provided, comprising a front section and a directed gas generation unit. The directed gas generation unit is capable of generating a quantity of pressurized gas and directing the quantity of pressurized gas forwardly of the front section and outwardly of the vehicle. In one embodiment, the directed gas stream is directed at an acute angle to the longitudinal axis of the vehicle.

In accordance with another aspect of the present disclosure, a method is provided for reducing drag on a vehicle. In one embodiment, the vehicle includes a front section. The method includes generating a pressurized stream of gas and directing the pressurized stream of gas forwardly of the front section of the vehicle and at an acute angle to the longitudinal axis of the vehicle.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
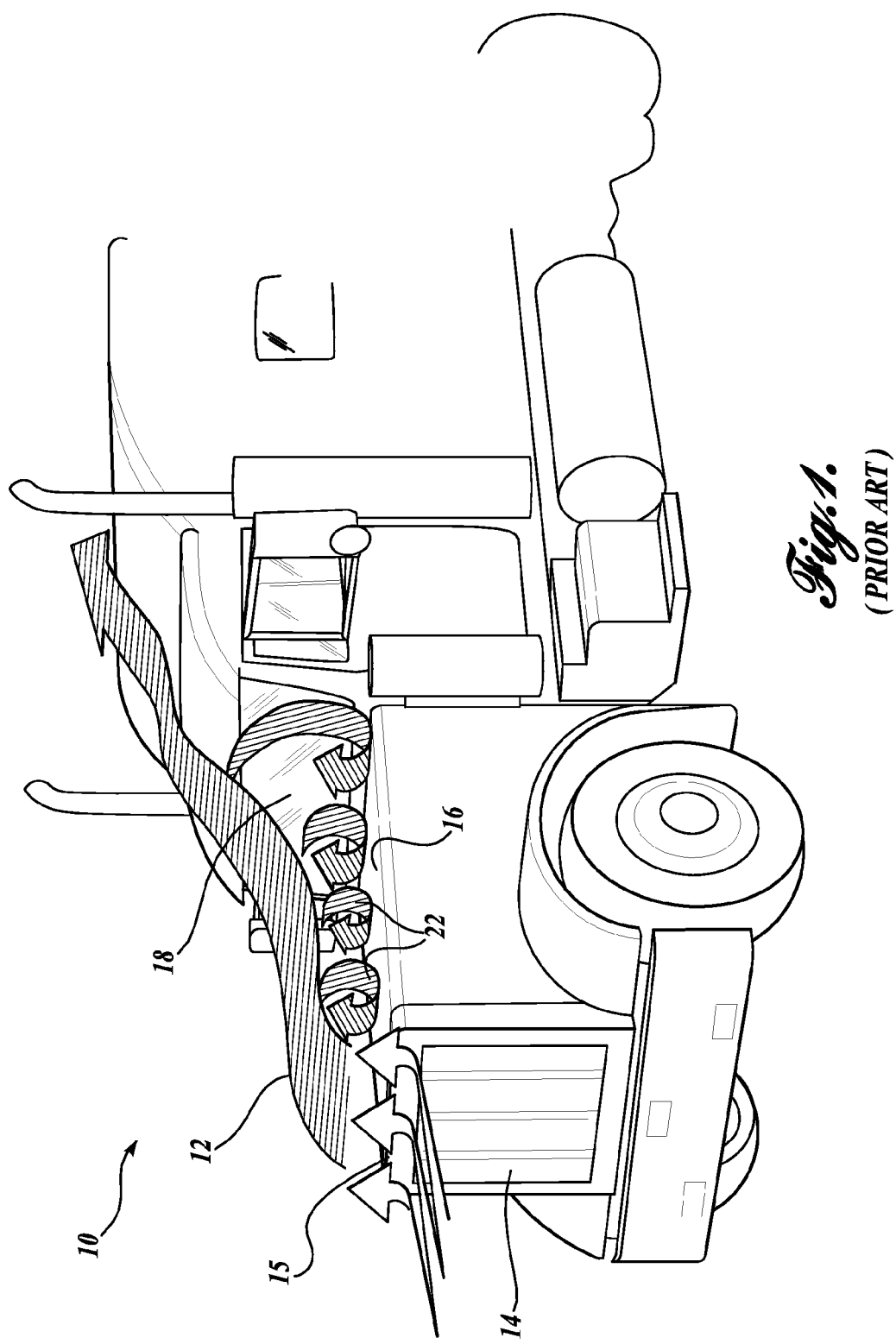
FIG. 1 is a front perspective view of a conventional tractor showing the flow path of an air stream over the front section thereof during movement of the vehicle.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of systems and methods for improving the aerodynamic efficiency (e.g., reduce drag) on vehicles, such as class 8 tractors and tractor-trailer combinations. Some embodiments are directed to systems and methods that utilize exhausted gases from an internal combustion engine (e.g., piston engine, rotary engine, turbine engine, etc.) of the vehicle for reducing the aerodynamic drag thereon. In other embodiments, the systems and methods utilize a generated gas flow from, for example, electric fans, engine driven or pneumatically/hydraulically driven pumps, etc., for reducing the aerodynamic drag on vehicles. As well be described in more detail below, the generated gas flow in several embodiments of the present disclosure is directed in a generally opposing direction of (i.e., against) prevailing cross winds.

Although embodiments of the present disclosure will be described with reference to a Class 8 tractor and/or tractor-trailer combination, including traditional as well as cab over engine configurations, one skilled in the relevant art will appreciate that the disclosed embodiments are illustrative in nature, and therefore, should not be construed as limited to such applications. It should therefore be apparent that the methods and systems of the present disclosure have wide application, and may be used in any situation where a reduction in the drag forces on a bluff body is desirable, including but not limited to passenger vehicles, light and medium duty vehicles, buses, RV's, trains, vessels, etc. It should be noted that for purposes of this disclosure, terminology such as "upper," "lower," "vertical," "horizontal," "fore," "aft," "inner," "outer," "front," "rear," etc., should be construed as descriptive and not limiting.

Prior to discussing the details of various aspects of the present disclosure, it should be understood that one or more sections of the following description may be presented in terms of logic and operations that may be performed by conventional electronic components. These electronic components, which may be grouped in a single location or distributed over a wide area, generally include controllers, microcontrollers, control units, processors, microprocessors, digital and/or analog logic circuits, etc. It will be appreciated by one skilled in the art that any logic described herein may be implemented in a variety of configurations, including but not limited to hardware, software, and combinations thereof. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. Accordingly, the following descriptions and illustrations herein should be considered illustrative in nature, and not limiting the scope of the present disclosure, as claimed.

Figure 2:
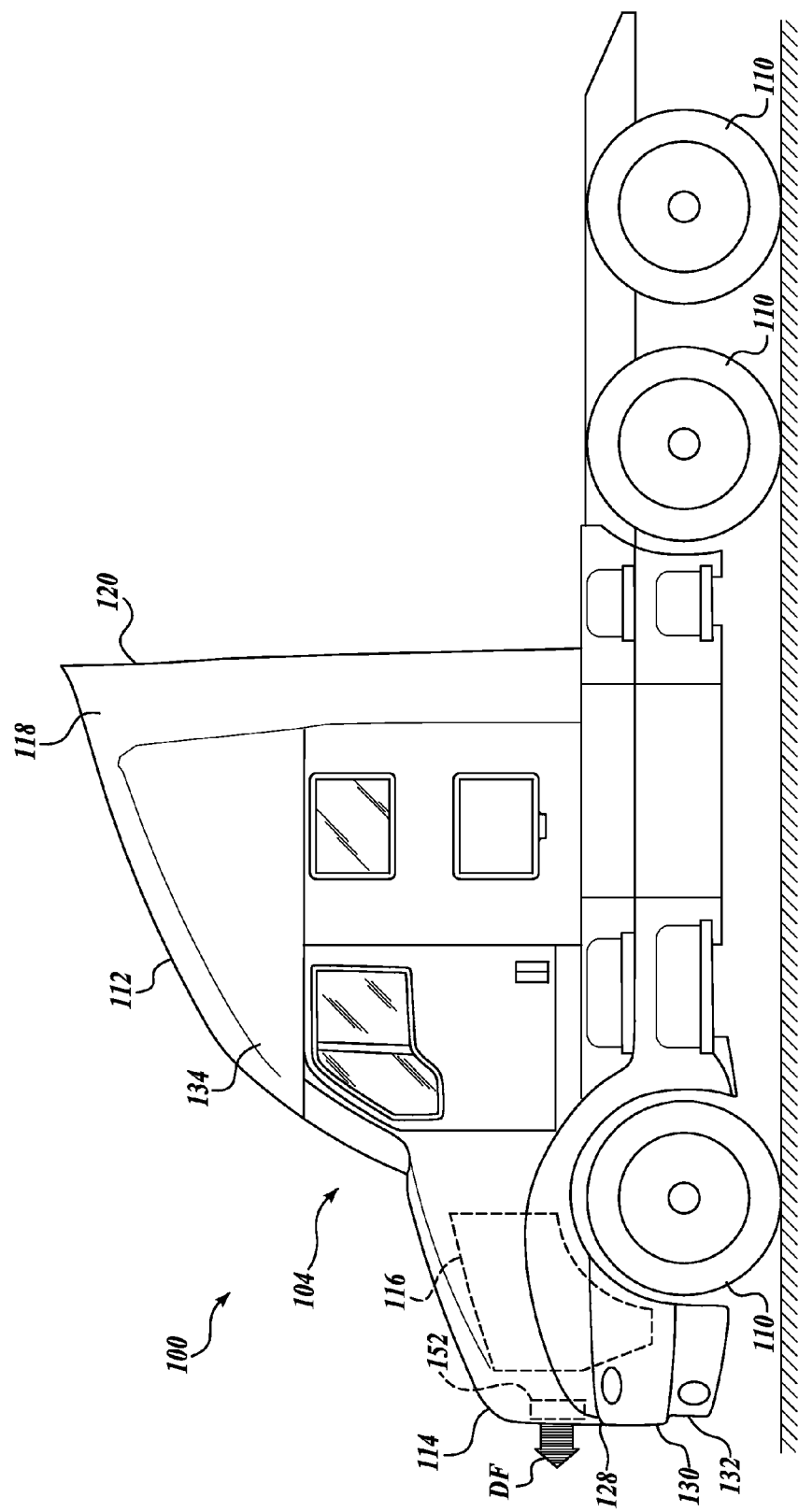
FIG. 2 is a side elevational view of a tractor incorporating a drag reduction system formed in accordance with aspects of the present disclosure.

FIG. 2 illustrates a one example of a vehicle, such as tractor 100, incorporating one embodiment of a drag reduction system 106 (See FIG. 4) formed in accordance with aspects of the present disclosure. During use, the drag reduction system directs pressurized gases to selected regions of the tractor 100 for reducing the aerodynamic drag thereon. In particular, embodiments of the drag reduction system 106 aim to provide aerodynamic drag reduction during crosswind flow (CF) conditions including zero crosswind flow conditions in which the crosswind flow angle, α, is 0.0. For reference purposes, the crosswind flow angle α is measured from the vehicle longitudinal axis A that also defines the vehicle direction of motion. As will be described in detail below, the drag reduction system 106 may be controlled to selectively determine when and/or at what flow rates the pressurized gases are directed to the selected region(s) of the tractor 100.

As best shown in FIG. 2, the tractor 100 comprises a chassis that is supported by wheels 110 connected thereto via conventional suspension assemblies (not shown). A conventional cab assembly 112 is supportably mounted on the chassis. The cab assembly 112 includes a front end 114 that generally houses an internal combustion engine 116 that propels the combination and a rear end 118 that defines a generally vertically oriented rear surface 120.

As is typical of highway tractors, the cab assembly 112 may include a cab, sleeper box and various roof fairings, cab or sleeper box extenders, and side trim tabs, if desired, but not required to appreciate the benefits of the present disclosure. Collectively, however, these structures are referred to herein as the cab assembly or cab 112. It will be understood, however, that a myriad of possible combinations and cab shapes can comprise the cab assembly. As is known in the art, the tractor 100 may include fairings or cowls mounting to the front end 114 for improving the aerodynamics of the tractor 100, if desired. As will be described in more detail below, the front end 114, in several embodiments, may further include portions of the drag reduction system 106 suitable for directing pressurized gases, generally designated DF, forwardly of the tractor grille 128.

Figure 3:
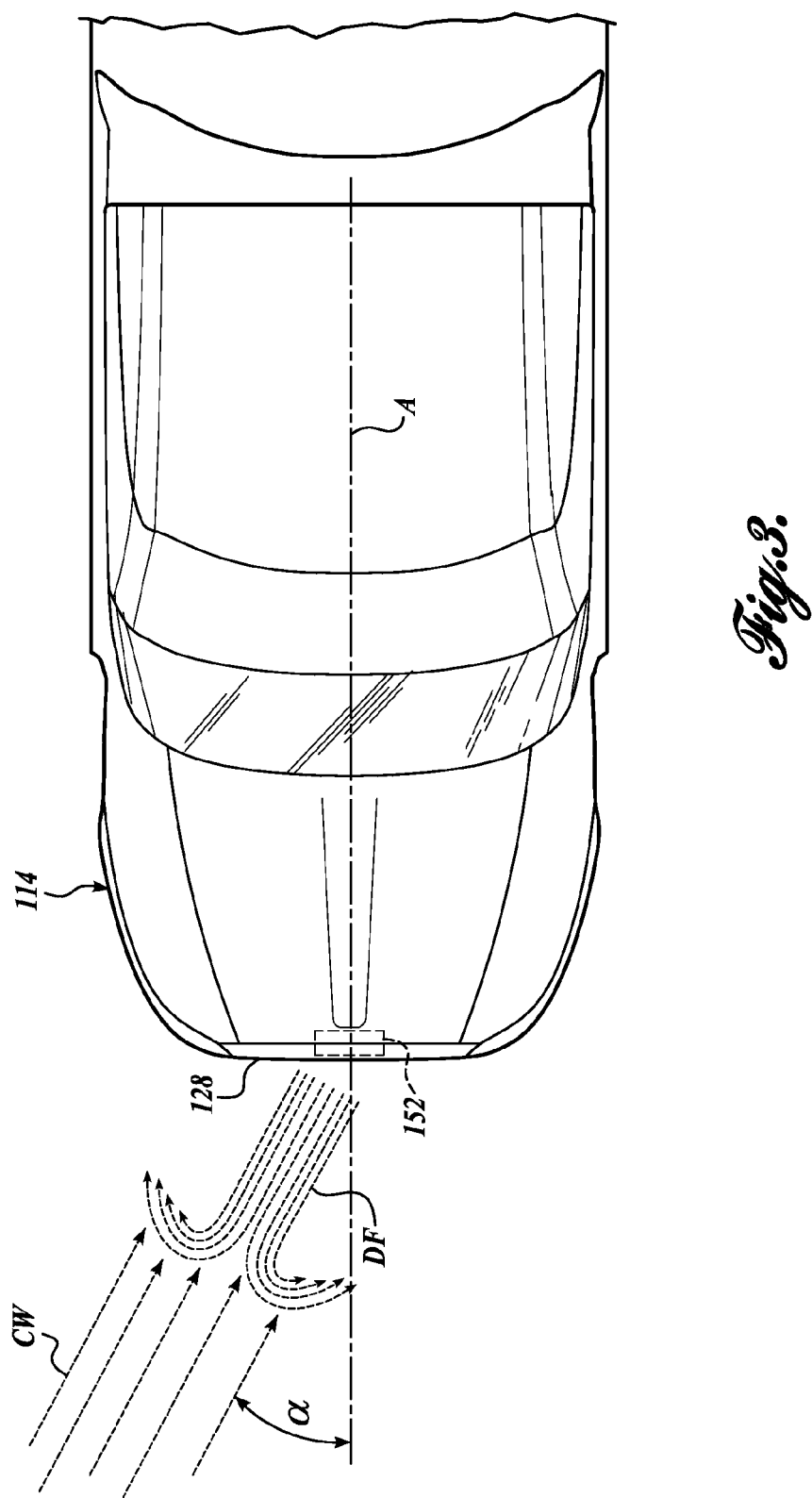
FIG. 3 is a partial top view of the tractor of FIG. 2 showing the flow path of a cross wind toward the front section thereof during movement of the vehicle.
Figure 4:
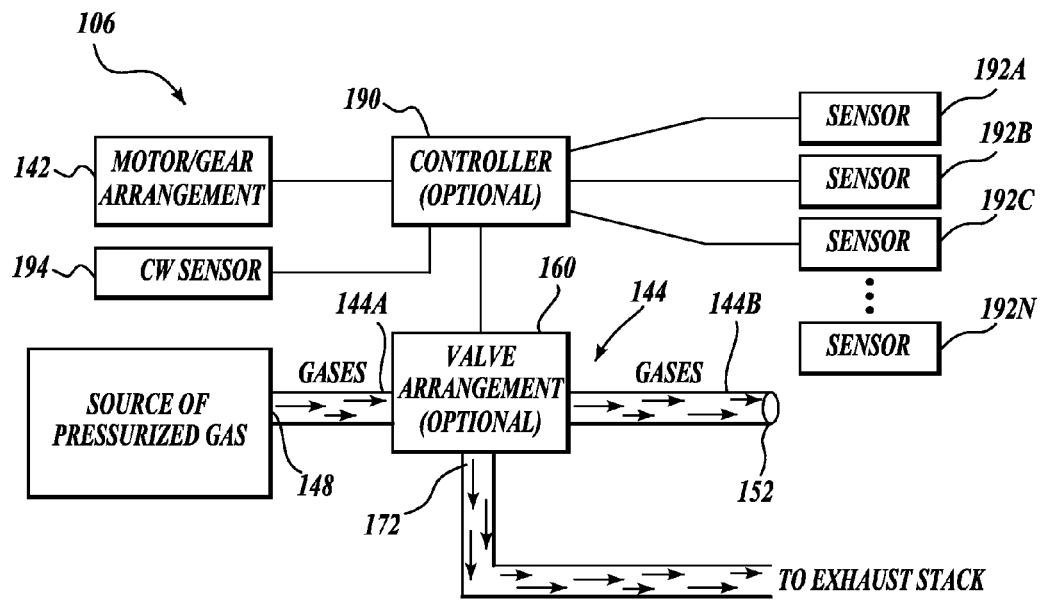
FIG. 4 is a schematic diagram of one embodiment of the drag reduction system formed in accordance with aspects of the present disclosure.

FIG. 4 is a schematic diagram of one embodiment of the drag reduction system 106 suitable for incorporation into the tractor 100 (see FIG. 2) and capable of introducing pressurized exhaust gases to selected regions of the tractor, for example, forwardly of the tractor grille 128, the bumper 130, the forward fairing 132, etc. The system 106 includes tractor piping structure 144 defining an inlet port 148 and at least one outlet or discharge port 152. In one embodiment, the discharge port 152 may be positioned behind the grille 128, as best shown in FIGS. 2 and 3. Preferably, the discharge port 152 directs gas forwardly of the tractor grille 128 and at an angle with respect to the longitudinal axis of the tractor 100. As will be described in more detail below, the angle of directed gas DF may be adjustable so as to correspond with or relate current crosswind flow (CF) conditions.

In other embodiments, the discharge port 152 may be positioned along the bumper 130, the forward bottom fairing 132, or the forward top fairing 134. In these embodiments, the discharge port can be mounted to or integrated into the aforementioned components of the tractor 100 in such as manner so as to direct the pressurized gas in a forwardly, angularly direction.

Returning to FIG. 4, the inlet port 148 is connected in fluid communication to a source of pressurized gas, such as the tractor engine 116 (shown schematically in FIG. 2). Alternatively, the source of pressurized gas can be an electric air pump, a piston, rotary or turbine engine driven air pump, a hydraulically/pneumatically driven air pump, etc.

In one embodiment, the system 106 may include a valve arrangement 160 operably connected in-between the inlet and discharge ports 148 and 152 of the tractor piping structure 144, if desired, for selectively determining the timing and/or quantity of pressurized gas routed to the at least one discharge port 152. As such, the valve arrangement divides the tractor piping structure 144 into first and second piping structure segments 144A and 144B. The valve arrangement 160 may include one or more valves, such as solenoid valves, needle valves, etc., and associated components. The valve arrangement 160 can be manually controlled to determine the flow rate of gas introduction, or may be electrically controlled, as will be described in more detail below. Other configurations of the system 106 are contemplated to be within the scope of the present disclosure. For example, the system 106 may include piping structure 144 but omit the valve arrangement 160. As such, in this embodiment, the discharge port 152 will receive an unrestricted flow of pressurized gas as long as the engine 116 or other source of pressurized gas is operating.

As was described above, the inlet port 148 in one embodiment is connected in fluid communication with the internal combustion engine 116 of the tractor 104. In this and/or other embodiments, the inlet port 148 of the tractor piping structure 144 may be connected to the exhaust manifold, exhaust piping, or exhaust passageway of the engine 116 in any manner known in the art so that exhausted gases generated by the engine 116 are supplied to the discharge port 152 through the tractor piping structure 144. Alternatively, the tractor piping structure 144 may include structure, such as an exhaust manifold, etc., so that the tractor piping structure 144 can connect directly to the engine 116 for receiving gas therefrom. In one embodiment of the present disclosure, the valve arrangement 160 may be configured and controlled such that gas exhausted from the engine 116 partially or fully by-passes the discharge port 152 and is vented to atmosphere, for example, through a conventional exhaust pipe stack or other exhaust piping structure (not shown) via piping structure 172.

As was described above, the valve arrangement 160 may be electrically controlled by an optional controller 190 shown schematically in FIG. 4. The controller 190 is connected in electrical communication with the valve arrangement 160 and other components, for example, one or more sensors 192A-N, as will be described in detail below. The controller 190 may include a logic system for determining the operation of the valve arrangement 160, which may be determined for each distinct application. It will be appreciated by one skilled in the art that the logic may be implemented in a variety of configurations, including but not limited to, hardware, software, and combinations thereof.

In one embodiment, the controller 190 may be a computing device that includes a processing unit, a memory, and input/output (I/O) circuitry connected in a conventional manner. The memory may include random access memory (RAM), read only memory (ROM), or any other type of digital data storage means. The I/O circuitry may include conventional buffers, drivers, relays and the like, for sending device appropriate signals to the valves of the valve arrangement 160.

The one or more sensors 192A-N are connected to the controller 190 each outputting a signal to the controller 190 indicative of an operating parameter of the tractor 100. For example, the sensors 192A-N may include but are not limited to an engine speed sensor for sensing engine speed, a throttle position sensor for sensing the position of the throttle valve (e.g., in spark-ignition engines), an accelerometer for sensing the acceleration of the vehicle, a wheel speed sensor for sensing the speed of the vehicle wheels, etc. The information from these sensors 192 and others may be utilized by the controller 190 to control the operation of the valve arrangement 160. For example, the controller 190 may operate the valve arrangement 160 to supply exhaust gas to the tractor discharge port 152 when, for example, the tractor 100 has reached a threshold speed (e.g., 10 mph) and/or when, for example, the tractor 100 is accelerating greater than a certain threshold amount. The controller 190 may also operate the valve arrangement 160 to terminate the supply of exhaust gas to the discharge port when, for example, the combination is idling. It will be appreciated that the controller 190 may comprise a separate processing unit dedicated to the valve arrangement 160. Alternatively, the functions carried out by the controller 190 may be carried out by an existing on-board processor, such as the engine control unit (ECU), or integrated or associated with another controller(s) of the vehicle.

In another embodiment of the system 106, one of the sensors 192 may be a brake sensor for sensing the application of brakes. In this embodiment, the system 106 would discontinue or reduce the introduction of exhausted gases through discharge ports 152 when the brakes of the tractor 100 are applied so as to increase the amount of resistance (drag) against the forward motion of the tractor 100, thereby improving the braking ability of the tractor 100. It will be appreciated that other ways in which the system 106 may be controlled will readily be apparent to those skilled in the art and, accordingly, will not be described in any further detail.

Figure 5A:
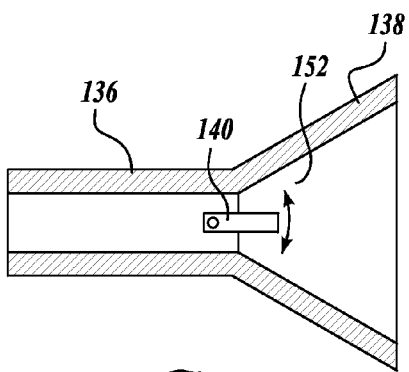
FIGS. 5A and 5B are schematic representations of top and side views of one example duct forming the outlet port of the drag reduction system of FIG. 4.
Figure 5B:
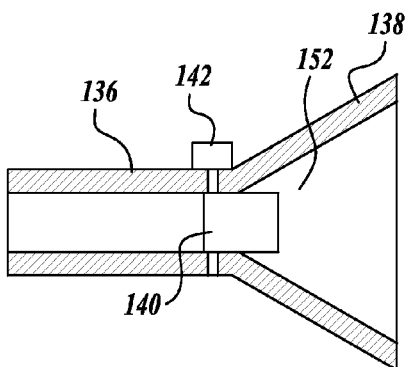

In various embodiments, the discharge port 152 may be formed by a biaxial duct 136, as best shown in FIGS. 5A and 5B. In one embodiment, the biaxial duct 136 is in the shape of a horn, having a flared bell mouth 138 from which exits the directed gas. In one embodiment, the biaxial duct 136 may further includes a gate 140 pivotally mounted about a vertical axis near the bell mouth 138. The gate 140 may be pivotally movable in a controlled manner between a first and second position via an electric motor/gear arrangement 142. As will be described in more detail below, the electric motor of the electric motor/gear arrangement 142 may receive suitable control signals for pivoting the gate 142 so as to change the direction of the directed gas flow exiting the duct 136.

In addition to selectively determining the timing and/or quantity of pressurized gas routed to the at least one discharge port 152, the direction of directed gas flow exiting the at least one discharge port 152 may also be selectively controlled. In that regard, the system 106 may further include a cross wind sensor that senses the direction of the current cross wind, and outputs signals indicative of current cross wind conditions to the controller 190. Based on the received signals, the controller 190 is capable of controlling the electric motor/gear arrangement 142 (FIGS. 5A and 5B) so as to pivot the gate 142 about an angle relative to the longitudinal axis of the vehicle that corresponds to or relates with the angle of the cross winds. For example, the gate 142 may be pivoted to an angle of approximately 30 degrees when the vehicle experiences cross winds of approximately 30 degrees. In other examples, the gate 142 may be pivoted to an angle of approximately 30 degrees when the vehicle experiences cross winds of more than or less than about 30 degrees, such as in the range of 30-60 degrees or 0-30 degrees, etc.

Figure 6:
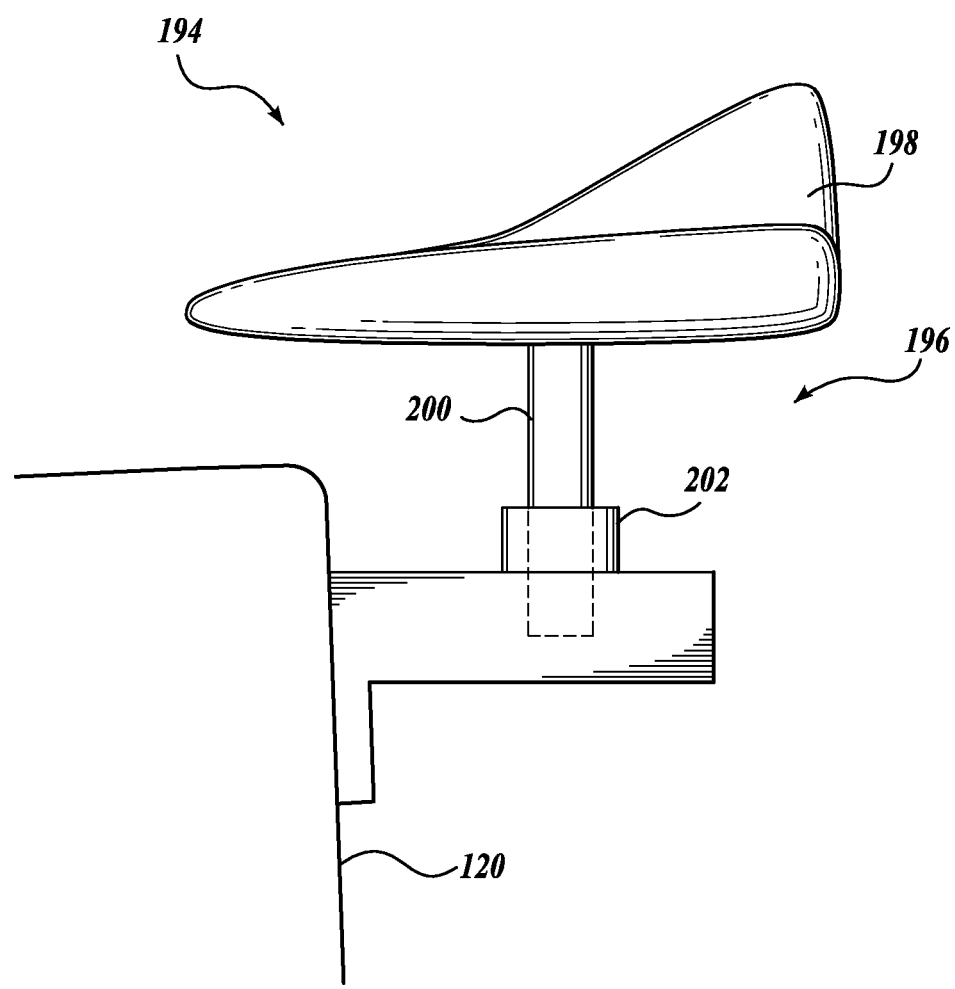
FIG. 6 is a representation of one exemplary cross wind sensor formed in accordance with aspects of the present disclosure.

Turning now to FIG. 6, one embodiment of an exemplary cross wind sensor 194 will be described in more detail. It will be appreciated that the cross wind sensor 194 may be any current or future developed sensor or device that generates signals indicative of the cross wind angle, α. In the embodiment of FIG. 6, an exemplary cross wind sensor 194 comprises a weathervane 196 having a plate-like head 198 attached to a rotatable shaft 200. The weathervane 196 is rotationally mounted to a portion of the tractor 100, such as the rear wall 120 of the tractor, so that the head 198 is exposed to the crosswind flow CF. The cross wind sensor 194 further includes a rotary encoder 202 that measures the rotation or angular position of the shaft 198, and generates signals indicative of shaft angular position to be transmitted to the controller 190.

The information from the cross wind sensor 194 may then be utilized by the controller 190 or other suitable device for controlling the operation of, for example, the electric motor/gear arrangement 142 for rotating the gate 142 when, for example, the tractor 100 is experiencing the presence of a cross wind flow CF. For example, when cross wind flow CF contacts the weathervane 196, the head 198 substantially aligns itself in the direction of the cross wind flow CF, resulting in rotation of the shaft 200. The encoder 202 generates signals of such shaft rotation angle, either relative or absolute, and transmits these signals to the controller 190, which in turn, controls the operation of the electric motor/gear arrangement 142. Operation of the electric motor/gear arrangement 142 pivots the gate 142 to the appropriate angle so that the directed gas exiting the discharge port 152 is in the direction of the cross wind.

Figure 7:
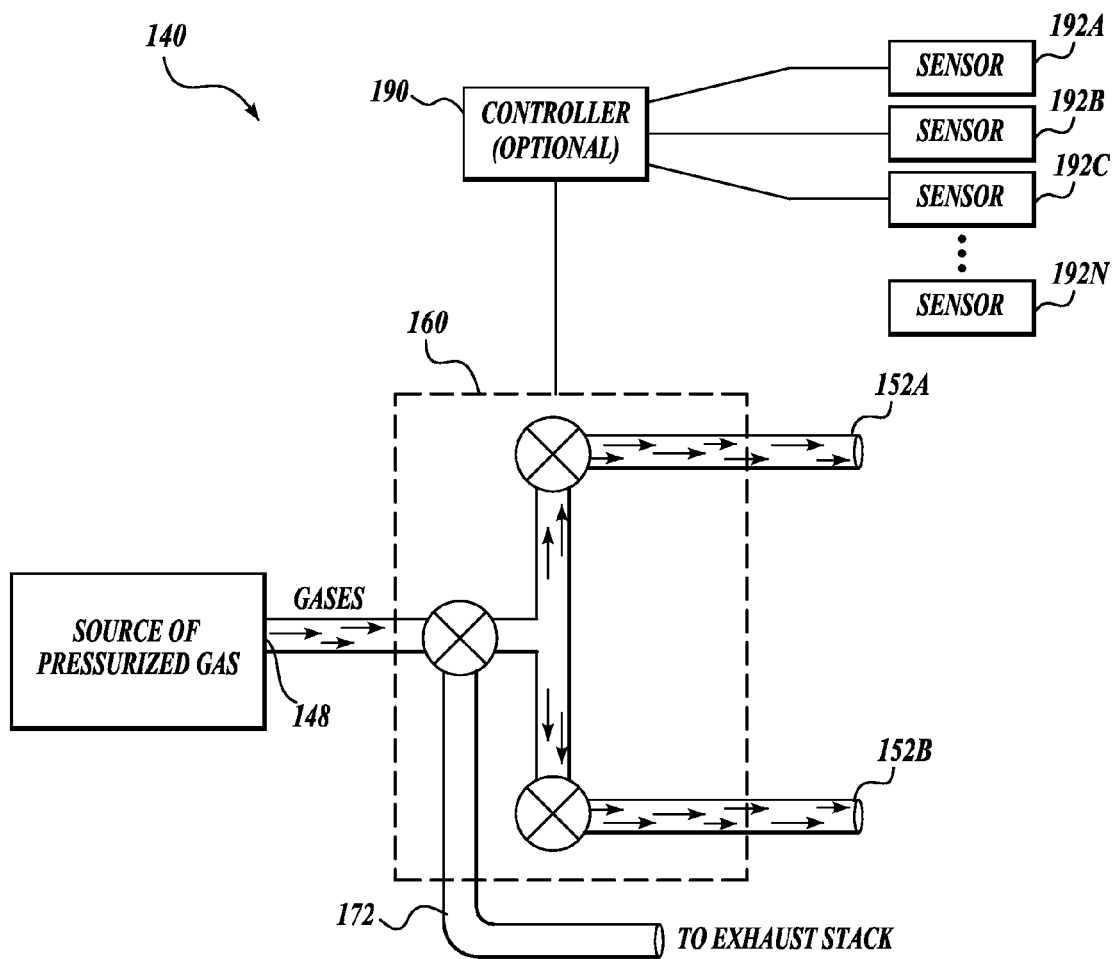
FIG. 7 is a schematic diagram of another embodiment of the drag reduction system formed in accordance with aspects of the present disclosure.
Figure 8:
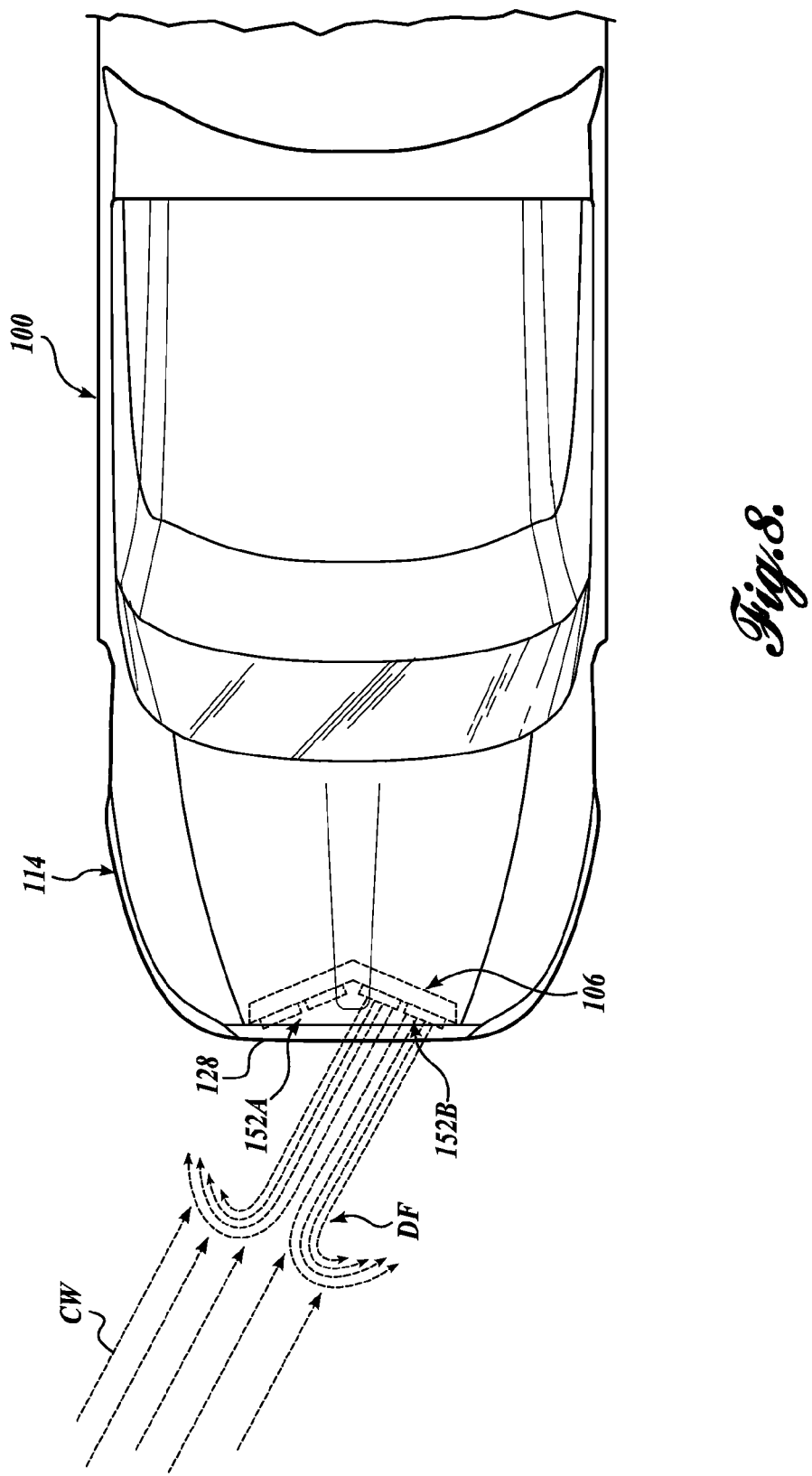
FIG. 8 is a top view of a tractor incorporating another embodiment of the drag reduction system in accordance with aspects of the present disclosure.

While one discharge port 152 is shown in the embodiment of FIGS. 2-4, it will be appreciated that in other embodiments, the tractor piping structure 144 may include a distribution manifold or plenum and other optional components, including control valves, etc., for forming first and second sets of one or more discharge ports 152A and 152B, as best shown in FIGS. 7 and 8. As best shown in FIG. 8, each set of one or more discharge ports 152A and 152B can be arranged at an angle with respect to the longitudinal axis of the vehicle. Associated control valves can be suitably controlled via controller 190 and/or the like so as to provide a biased control of directed gas flow in response to data, such as cross wind measurement data from cross wind sensor 194.

Figure 9:
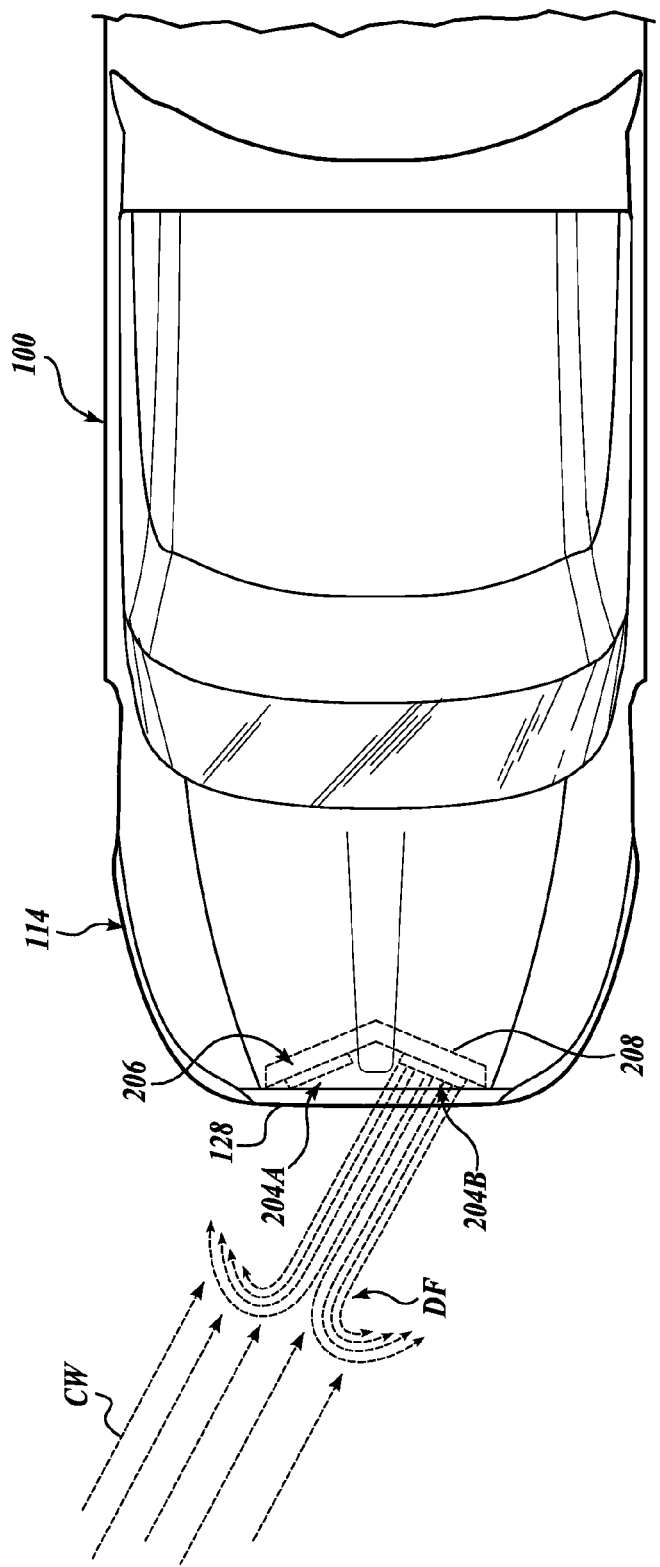
FIG. 9 is a top view of a tractor incorporating yet another embodiment of the drag reduction system in accordance with aspects of the present disclosure.

FIG. 9 is another embodiment of a drag reduction system 206 formed in accordance with aspect of the present disclosure. As best shown in FIG. 9, first and second sets of one or more fans 204A and 204B of the cooling system can be used as the source of directed gas for the system 206. In that regard, the fins of the first and second sets of one or more fans 204A and 204B are configured such that upon rotation, a flow of directed gas DF is generated forwardly of the engine compartment, through the vehicle grille 128. In the embodiment shown, the fan(s) are mounted in front of the radiator 208 and at an angle to the longitudinal axis of the vehicle. In one embodiment, the first and second sets of one or more fans 204A and 204B are electrically powered, and can be individually controlled by a controller, such as controller 190. In other embodiments, the first and second sets of one or more fans 204A and 204B are electrically powered and can be controlled by a controller, such as controller 190, so as to provide a biased control of directed gas flow in response to data, such as cross wind measurement data from at least one sensor, such as cross wind sensor 194. As well as improving aerodynamics, forward ejection of gas from the engine fans provides a number of additional advantages. For example, the stagnating gas in the engine compartment is better vented by the forward ejections of gas and also allows for better flow though the cooling components.

In other embodiments, one or more electric fans can be employed to direct gas forwardly of the vehicle in an angular manner. In these embodiments and others, the electric fans can be discrete from the vehicle's cooling system fans, and can be mounted to pivoting structure that allows the one or more electric fans to pivot in the direction of the prevailing cross wind. Such pivoting structure may be operatively coupled to an electric motor/gear arrangement, similar to arrangement 142 described above. The arrangement, upon receiving appropriate control signals from controller 190 or other suitable device, may rotate the one or more fans to a suitable angle so that the directed gas discharged from the one or more fans is in the general direction of the cross wind.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A vehicle having a longitudinal axis and left and right sides positioned laterally outwardly of the longitudinal axis, comprising:
   a front section;
   a cross wind sensor configured to generate an output indicative of a yaw angle of an exterior cross wind flow impinging on the vehicle, wherein the yaw angle of the cross wind flow is determined with respect to the longitudinal axis of the vehicle; and
   a directed gas generation unit configured to generate a stream of pressurized gas and to direct the stream of pressurized gas forwardly of the front section and laterally outwardly of either the left or right side of the vehicle at an acute angle with respect to the longitudinal axis of the vehicle, wherein the acute angle is based at least in part on the output of the cross wind sensor.

2. The vehicle of claim 1, wherein the directed gas generation unit is one or more fans.

3. The vehicle of claim 2, wherein the one or more fans are one or more cooling fans for cooling an engine of the vehicle.

4. The vehicle of claim 1, wherein the directed gas generation unit comprises a gas stream ejector coupled to a source of pressurized gas, the gas stream ejector positioned in a manner so as to direct a gas stream forwardly of the front section, outwardly of the vehicle, and at an angle to the longitudinal axis of the vehicle.

5. The vehicle of claim 4, wherein the gas stream ejector includes a duct having a flared bell mouth and a pivoting gate that directs the gas stream flowing through flared bell mount in a particular direction.

6. The vehicle of claim 5, further comprising a controller for controlling the angular position of the pivoting gate based on the output of the cross wind sensor.

7. The vehicle of claim 1, wherein the directed gas generation unit includes:
a source of pressurized gas; and
piping structure defining an inlet and a discharge port, the inlet being connected in fluid communication with the source of pressurized gas to receive pressurized gas therefrom and the discharge port being positioned to direct the pressurized gas generated from the source of pressurized gas forwardly of the front section and at the acute angle to the longitudinal axis of the vehicle.

8. The vehicle of claim 7, wherein the source of pressurized gas is an internal combustion engine, and wherein the inlet of the piping structure is connected in fluid communication with an exhaust system component of the internal combustion engine.

9. The vehicle of claim 7, wherein the source of pressurized gas is selected from a group consisting of an electric pump, an electric fan, a mechanically driven fan, mechanically driven pump, a pneumatically driven pump, and a hydraulically driven pump.

10. The vehicle of claim 7, further comprising at least one valve positioned between the inlet and the discharge port of the piping structure, the valve capable of selectively supplying pressurized gas to the discharge port.

11. The vehicle of claim 10, wherein the valve is either manually or electrically controlled.

12. The vehicle of claim 1, wherein the directed gas generation unit is configured to adjust the angle of directed, pressurized gas with respect to the longitudinal axis of the vehicle.

13. The vehicle of claim 12, wherein the directed gas generation unit adjusts the angle of directed, pressurized gas with respect to the longitudinal axis of the vehicle based on the output of the cross wind sensor.

14. The vehicle of claim 1, wherein the front end includes:
an engine compartment;
an engine mounted in the engine compartment; and
a grille mounted in front of the engine;
wherein the directed gas generation unit comprises the engine and an exhaust stream ejector coupled to the engine, the exhaust stream ejector positioned forwardly of the engine and configured to direct a stream of gas forwardly of the grille and at the acute angle to the longitudinal axis of the vehicle.

15. The vehicle of claim 1, wherein the front end includes:
an engine compartment;
an engine mounted in the engine compartment;
wherein the directed gas generation unit comprises one or more engine cooling fans configured to direct a stream of gas forwardly of the engine compartment and at the acute angle to the longitudinal axis of the vehicle.

16. A method of reducing drag on a vehicle, the vehicle having a front section, the method comprising:
generating an output indicative of a cross wind flow angle by a cross wind sensor, wherein the cross wind flow angle represents a yaw angle of cross wind flow impinging the vehicle with respect to the longitudinal axis of the vehicle;
generating a pressurized stream of gas; and
directing the pressurized stream of gas forwardly of the front section, laterally outwardly of either the left or right side of the vehicle, and at an acute angle with respect to the longitudinal axis of the vehicle, wherein the acute angle is based at least in part of the output of the cross wind sensor.

17. The method of claim 16, wherein the pressurized stream of gas is generated by one or more cooling fans.

18. The method of claim 16, wherein directing the pressurized stream of gas forwardly of the front section of the vehicle further comprises:
ejecting the pressurized stream of gas from a gas duct forwardly of the front section of the vehicle and at the acute angle to the longitudinal axis of the vehicle.

19. The method of claim 16, wherein the angle of ejection of the gas is selectively controlled.

20. The method of claim 16, wherein the pressurized stream of gas is generated by an internal combustion engine.

* * * * *